May 14, 1957       J. L. GOLDENBERG       2,792,148
VENDING MACHINE CONTROLLED BY CREDIT IDENTIFICATION MEANS
Filed Feb. 20, 1956       2 Sheets-Sheet 1
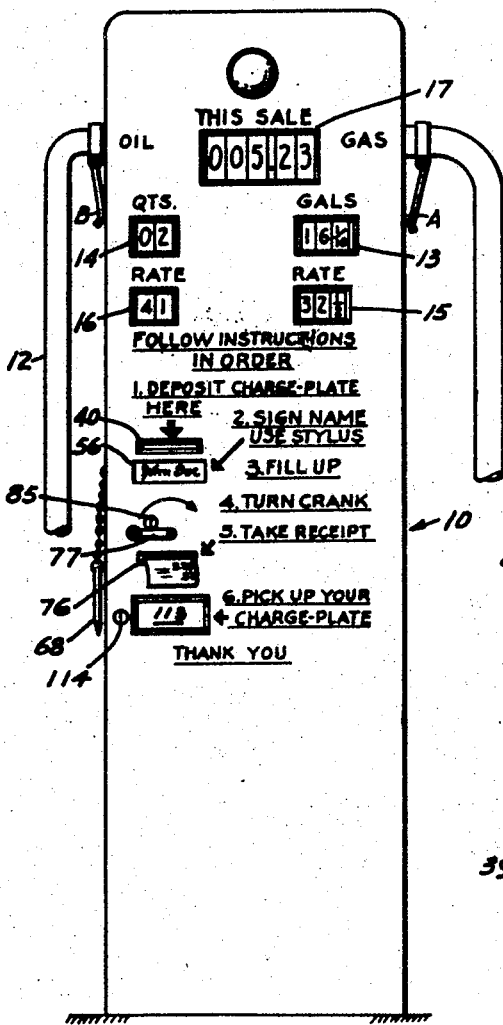
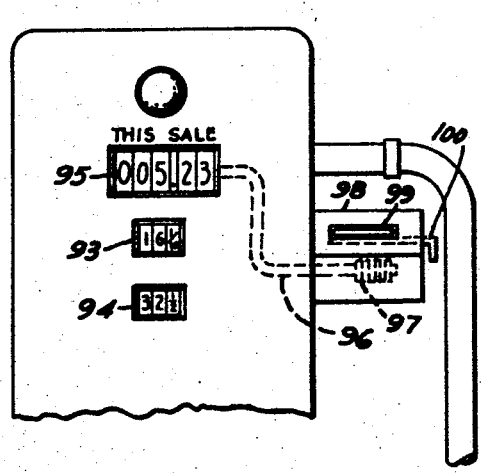
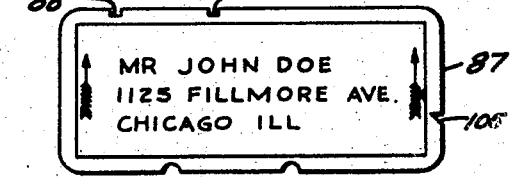
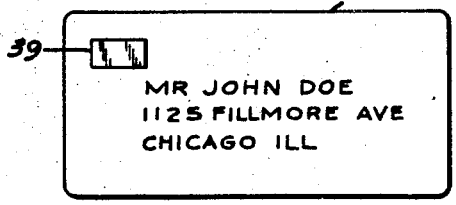
INVENTOR.
JULIUS L. GOLDENBERG
BY
D. Gordon Angus
ATTORNEY.

May 14, 1957 J. L. GOLDENBERG 2,792,148
VENDING MACHINE CONTROLLED BY CREDIT IDENTIFICATION MEANS
Filed Feb. 20, 1956 2 Sheets-Sheet 2
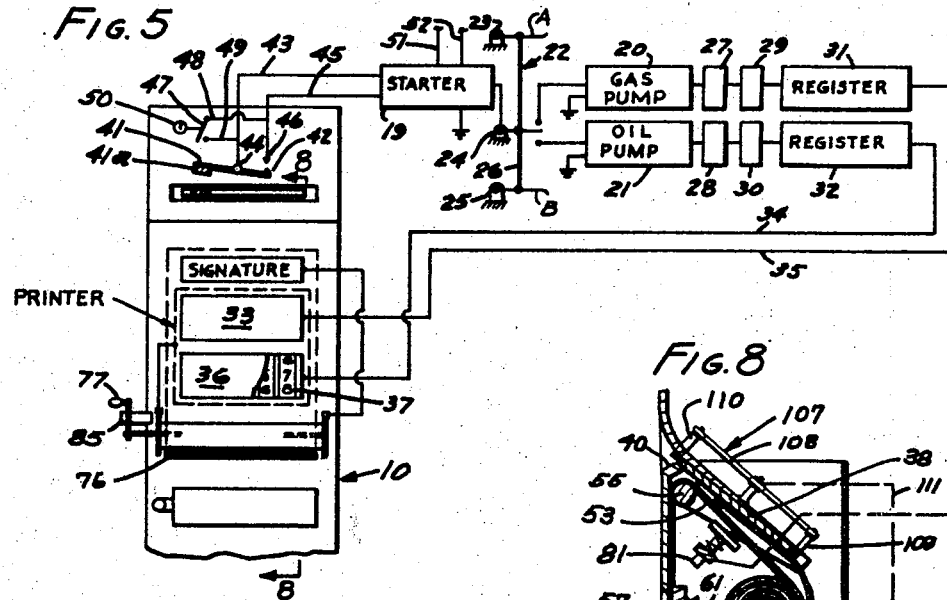
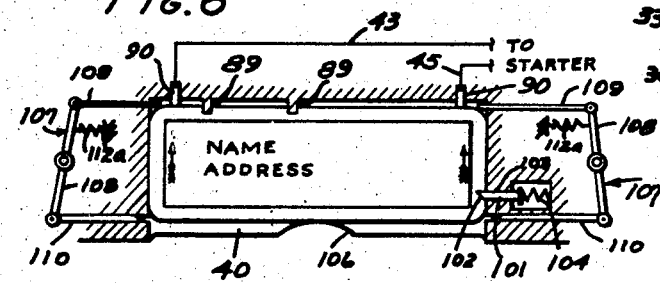
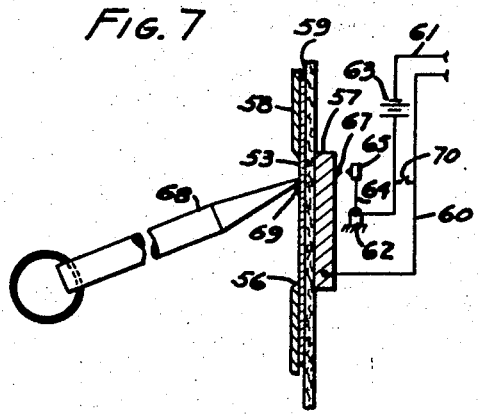
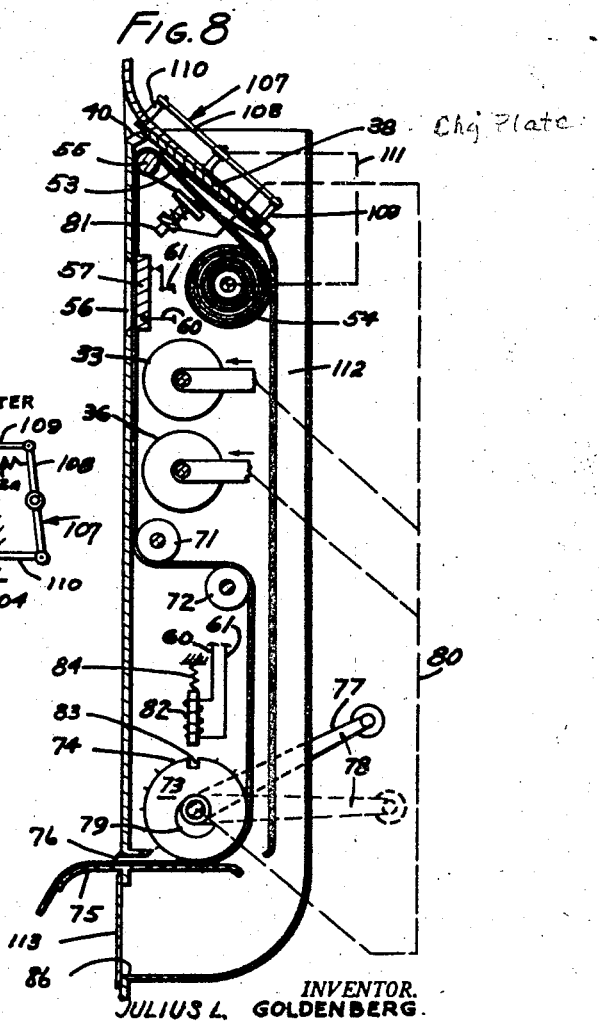
INVENTOR.
JULIUS L. GOLDENBERG
BY D. Gordon Angus
ATTORNEY.

United States Patent Office 2,792,148
Patented May 14, 1957

2,792,148

VENDING MACHINE CONTROLLED BY CREDIT IDENTIFICATION MEANS

Julius L. Goldenberg, Los Angeles, Calif., assignor to Hotelevision Company, Los Angeles, Calif., a copartnership Application February 20, 1956, Serial No. 566,520

3 Claims. (Cl. 222—2)

This invention relates to vending machines capable of billing out the merchandise which they dispense.

The retail sale of divisible merchandise, such as petroleum products, for example, involves a fairly large amount of personal supervision, not only in the actual dispensing of the products, but in the calculation of the sum due, and in the billing for that sum. In an effort to reduce these high labor costs, many service stations have resorted to self-service, where the customer pumps his own gasoline and oil. It has frequently been found, however, that the labor saving has not been as great as anticipated, inasmuch as an attendant had to be available to go to the automobile and personally collect the sum due, or because, even if the customer had a credit card, the attendant had to make out an invoice. It has frequently occurred that as many attendants were needed for this purpose as for giving complete service, so the economy which might have resulted from customer self-service could not be obtained.

It is an object of this invention to provide a vending machine capable of dispensing any desired quantity of a divisible product, such as petroleum supplies, which calculates the sum due, and which bills the purchaser, so that collections may be made either at the pump or by a central cashier.

A related but optional object is to provide a means whereby the vending machine may be actuated by a credit card, and whereby the credit card will be held by the machine until an invoice is signed by the customer, thus permitting complete self-service, with no supervision whatever.

This invention is carried out in combination with a vending machine provided with meter means for determining the quantity dispensed, and with calculator means for calculating the cost of the goods dispensed as a function of the unit price. A printer driven by the calculator means is adapted to print the sum due on an invoice or bill.

An optional feature of this invention resides in means for the reception of a charge plate, which means are so disposed and arranged as to print the name of the purchaser on the invoice or bill after the commodities are withdrawn.

Still another optional feature of this invention resides in means for requiring a signature on said slip or bill before the charge plate can be removed from the adding mechanism, and means whereby the insertion of the charge plate may be made a pre-requisite to starting the vending machine.

The above and other features of this invention will be fully understood from the following detailed description and the accompanying drawings, of which:

Fig. 1 is a side elevation of a vending machine incorporating the invention;

Fig. 2 is a partial side elevation of another pump embodying certain features of the invention;

Figs. 3 and 4 are plan views showing charge plates adapted for use in an embodiment of this invention;

Fig. 5 is an elevation, partly in schematic notation, and partly in cross-section, showing a system incorporating the invention;

Fig. 6 shows an alternate means for adapting a charge plate to the system of Fig. 5;

Fig. 7 is a detailed view of means for requiring signatures for bills issued by the device of Fig. 5; and Fig. 8 is a fragmentary side view, partly in cross section, taken at line 8—8 of Fig. 5.

Fig. 1 shows a vending machine 10 adapted for the sale of liquid petroleum products. A gasoline hose 11 and an oil hose 12 are provided, and conventional meter indicators 13, 14, for gasoline and oil respectively, read out the volume delivered. Rate indicators 14, 16 show the price factor, and register indicator 17 displays the sales price of the commodity dispensed. In the illustrations, only the gasoline system is provided with a register indicator, although both systems could have been so provided, if desired. Computing pumps and mechanisms of this type are well-known and require no further detailed disclosure here.

With reference to Fig. 5, which shows one embodiment of the invention adapted to be used with the pump of Fig. 1, a starter 19 is provided for the gas pump 20 and oil pump 21. A two-throw switch 22 with a handle A on the gasoline side and a handle B on the oil side selectively connects the starter to the gas pump or oil pump. The switch also has a neutral position where neither pump is operated. The switch is conveniently provided with three hinge bars 26 which are pivoted to the hinge blocks. Pulling handle A starts the gas pump, and pulling handle B starts the oil pump.

Fluids are withdrawn from the hoses when the nozzles (not shown) are opened, and the passage of fluid through said hoses drives gas meter 27 or oil meter 28, causing meter indicators 13, 14, respectively, to indicate quantities withdrawn. The meters, in turn, drive rate units 29, 30, which may simply be gear reduction or gear multiplication units with the gear ratios set at the ratios shown on the rate indicators 14, 16. The rate units 29, 30 drive registers 31, 32, for gas and oil respectively. The meters and rate units and registers comprise calculator means for calculating the sum due, while the register unit is provided with read-out means such as register indicator. The registers may simply comprise conventional Veeder-Root counters, if desired, or any other means for totalling the output of the meters and rate units. Simply gearing the meter output to a counter through a rate unit however, appears to be the preferable means for such a calculation, and is adaptable to conventional computing pumps. Such counters are well-known and need no further description here. They customarily have a train of counter wheels driven from a single drive shaft, the indicated count being proportional to the number of revolutions of the shaft. The register indicators 17 and 18 are usually numerals mounted on the periphery of the counter wheels.

The gasoline register 31 drives a printer 33 through a tachometer cable 34, and a second tachometer cable 35 drives printer 36 from the oil register 32. The printers may conveniently be multi-wheel counters of the same type as registers 31 and 32, and may be driven from the same ratio unit, or as shown by a cable connection from the register. The counter wheels of the printers are provided with raised figures 37 for printing purposes.

Means are provided for requiring the insertion of a credit card, such as card 38 of Fig. 4, for example, or other credit identification means, in the pump, before the system can be operated to dispense products. This card is a well-known variety, in which a small magnet 39 is disposed in a coded position in the card, which position may be changed periodically as a credit check for keeping credit identification up to date. A slot 40 in the face of the vending machine receives the card, and guides the card to a position adjacent a pivoted, electrically conductive arm 41. The pivoted arm may be moved so as to correspond to the coded position of the magnet 39.

A pole piece 41a of magnetic material is placed on one end of the arm, opposite the anticipated magnet position. A contactor 42 is placed on the opposite end of the arm from the pole piece. A lead 43 from the starter connects to a pivot 44, the pivot being disposed between the pole piece and the contactor. Lead 45 interconnects the starter and a contactor 46. Contactor 42 is adapted to touch contactor 46 when the pole piece 41a is drawn toward magnet 39 as a credit card is inserted in slot 40.

A by-pass switch 47 bridges two leads 48, 49 which jump across leads 43 and 45. The starter circuit can be closed by switch 47, and a credit card will not be needed for starting the pump. A lock 50 protects the switch 47, so that a key is necessary to close the switch, and operation without a credit card is thereby impossible unless lock 50 is opened. With switch 47 locked open, the pump can be left unattended, and will dispense gasoline or oil only after credit identification is placed in the slot 40.

Power leads 51, 52 furnish energy to the starter. Transmission of power from leads 51, 52 is controlled by the credit system connected to leads 43 and 45. Thus this credit system constitutes an override means which prevents pump operation until its requirements are met by cutting off starter energy unless the credit circuit through leads 43 and 45 is closed.

Means are also provided for requiring a signature on an invoice prepared by the vending machine before the credit card can be recovered by the customer. These means are provided because it is commonly desired that in addition to getting a credit card from the purchaser, a signature should also be obtained. Figs. 7 and 8 show means for this purpose.

As will be seen in Fig. 8, the invoice paper 53 is rolled from a spool 54 within the pump. This paper can be manifolded with carbon sheets (not shown) to make the necessary carbon copies. The paper is led over a guide roll 55 to pass beneath the charge plate 38 in the slot 40. The paper is led over the guide roll downward past an open port 56 which opens on the face of the pump. A backing plate 57 of magnetizable and electrically conductive material is placed back of the port and is spaced from the face wall of the pump so that the paper can pass in front of the plate. The paper may be backed up by a sheet of carbon paper 59 placed between the paper 53 and the backing plate 57 in the event that manifolded paper is not used. Pressure on the front of the paper 53 would then cause an impression to be made on the invoice by the carbon paper. If manifolded paper is used, then carbon paper 59 can be omitted.

A first lead 60 is connected to the backing plate 57, and a second lead 61 is connected to a hinge block 62 spaced from the backing plate. A battery 63 or other current source is connected in lead 61. An arm 64 is pivoted to hinge block 62 and said arm has a magnetizable block 65 thereon. Said block has a contact 66 adapted to be drawn against contact 67 on the backing plate.

A stylus 68 having a writing point 69 at the tip thereof is comprised of a magnetized material, or may comprise a simple pencil or other means having a magnet attached thereto. Carbon paper 59 or the manifolded carbon is protection against the purchaser's signing the slip without lead in the pencil. Even if there is no lead in the pencil, the signature from the carbon sheet will be present. When the stylus is brought into contact with the paper while writing the signature, the magnetizable block 65 is pulled toward the backing, so that contacts 66 and 67 are joined and a circuit is completed through lead 60 and 61. A bypass switch 70 is provided which jumps across leads 60 and 61 so as to eliminate the need for a signature, if credit card operation is not desired. In that event, the switch 70 is closed, and the system will operate independently of this circuit.

The invoice paper 53 is led past the port 56 and over idler spools 71 and 72. A drive sprocket 73 is provided with sprocket teeth 74 for making perforations in the edge of the invoice paper and to draw the paper through the device. From the drive sprocket the paper emerges over a guide 75 out through slot 76 in the face of the pump.

A handle 77 is provided for turning the drive sprocket. The handle 77 is provided with an arc 78 of motion which is free of the drive sprocket so that the handle can move through that angle independently of the drive sprocket. The free motion is limited by a catch 79 on the drive sprocket which engages the arm when the arm abuts against it as shown in the lower dashed position in Fig. 8.

A linkage 80 is provided between the printers 33 and 36, and includes a plunger 81. By turning the handle 77 through the arc 78, the linkage 80 forces the printers 33 and 36 against the paper 53, the numbers on the printers printing on the invoice paper through carbon paper or any other desired means. This handle action also forces the plunger against the invoice paper so as to cause the charge plate to leave its imprint upon the invoice paper. The plunger 81 may be inked if desired or may carry a carbon paper to leave a visible imprint on the paper from the side on which the plunger is disposed, or, if the paper is manifolded with carbon paper the paper itself provides means for making the imprint of the printer visible.

A solenoid 82 is disposed opposite a notch 83 in the periphery of the sprocket wheel so as to be maintained in the notch 83 by means of a spring 84 unless the solenoid is actuated. Leads 60 and 61 from the signature system of plate 87 are connected to the solenoid, so that when the contacts 66 and 67 are drawn together and the circuit is complete, the solenoid will be withdrawn from the notch 83, and the sprocket can be turned. If desired, a holding circuit such as a relay may be provided in this circuit to hold the solenoid withdrawn for a time.

A lock 85 is provided to hold the handle against rotation when the system is desired to be out of service. A plate slot 86 is disposed beneath the slot 76 and is adapted to return the charge plate after the signature has been applied to the invoice paper.

Means are provided for holding the credit identification means until a signature is affixed to the invoice, or until an invoice is withdrawn from the vending machine, as preferred. These means are shown in detail in Figs. 6 and 8. As shown in Fig. 6, a catch pin 101 with a slanted end portion 102 is adapted to be forced back in a slide 103 against a spring 104. The catch pin engages into a slanted notch 105 on the edge of the card. The pin is snapped into this notch by the spring 104, and prevents the card from being pulled out of the slot. Even if this catch pin were not present, the card must be pushed all the way into the slot to make the proper connections, and since the finger cannot pass beyond the cut out 106 in the slot, no grip can be had on the card to pull it out. The slanting angle of the notch, along with the slant on the pin do, however, permit the card to pass through the slot by means of a force exerted by ejector means 107.

Ejector means 107 comprise a pivoted arm 108 with a spacer member 109 and an ejector member 110 attached thereto. A line 111 is connected to spool 54, and when the spool 54 is turned, the link causes the pivoted arms to turn so that the spacer members are withdrawn and the ejector members are pressed against the card. This shoves the card backward into slot 112 in the pump. Release of the link 111 causes spring 112a to pull the arm 108 so that spacer member 109 stops the next credit card in a correct operational position. If desired the card of Fig. 4 may also be provided with a side notch such as notch 105.

A door 113 at the bottom of slot 112 closes the plate slot 86, and stops a falling credit card. In the event that a check of the signature on the invoice is desired, a lock 114 on the door may be secured, and the credit card will then be retained until an attendant opens the door, after taking whatever supervisory measures he wishes.

Figure 3 shows still another embodiment of a charge plate adapted for automatic use with this device in which a charge plate 87 has notches 88 in its edge. The position of these notches may be changed whenever new credit cards are issued so as to keep the credit system up to date. The slot 40 of the pump is provided with pins 89 (see Fig. 6) which are placed so as to enter the notches 88 and electrical contacts 90 are disposed on opposite sides of the slot, with the leads 43 and 45 connected to the contacts 90. Unless the notches and pins are in registration, the card cannot make contact with electrical contacts 90. This credit system may therefor be directly substituted in Fig. 5 for the system shown therein. The edge of the charge plate is made of a conductive material.

A simpler form of the invention is shown in Fig. 2, in which the pump is set up for delivery of a single commodity and is provided with a meter indicator 93, a rate indicator 94 and a register 95, said register indicator operating from a register in the same fashion as in the device of Fig. 1. A mechanical interconnection such as a tachometer cable 96 is operated by the register indicator 95 so as to turn printing wheels 97 in a printer 98 attached to the side of the pump. A slot 99 is provided in the printer for receiving any desired credit card and a printing lever 100 is provided for pressing invoice paper (not shown) against the printer wheel and credit card. Such credit card printing devices are well-known and require no further disclosure here.

The operation of the device of Fig. 1 will now be described. When products are to be issued on the basis of a credit card, the lock 50 is secured so that bypass switch 47 is opened. The customer inserts his credit card into slot 40, and when the credit card of Fig. 4 is used, the magnet 39 will draw the magnetizable block 41a toward it, so that the contatcor 42 touches contactor 46. The starter control circuit is now completed, and the starter can operate. Lever A or B is pulled, depending on whether gasoline or oil is desired, and the selected pump is thereby actuated by the starter. The flow of fluid through the hose is permitted by opening the nozzle, and using the gas system of Fig. 5 as an example of both systems therein, the meter 27 begins to turn so as to indicate the total delivery and drives the rate unit. The rate unit 29 is, in effect, a gear reduction which multiplies the revolutions of the meter by a factor proportional to the unit cost of the gasoline. The output from the rate unit is applied to the register 31, which register acts as a counter or totaliser, and displays the total cost on the rate indicator 17. It also drives a printer 33 through tachometer cable 35, and the printer assumes a condition duplicating that of the register.

If oil is to be pumped, the lever B is pulled and the oil pump actuated and the total purchase cost thereof is transferred to the printer 36 in the same manner as the gasoline purchase cost was transferred to its printer.

When the delivery of commodities is completed and the purchaser desires to recover his credit card, he takes the stylus 68 and signs his name on the invoice paper 53 through the port 56. While the stylus is thus in contact with the paper, the arm 64 is drawn forward toward the backing plate so that the contacts 66 and 67 meet and the circuit through leads 60 and 61 is complete so that solenoid 82 is withdrawn from the notch 83. The handle is turned through its free motion to force printers 33 and 36 against the invoice paper and also to force plunger 81 against the paper so as to press the paper against the credit card. This prints the credit information and the cost of the merchandise on the invoice. Then the handle meets the catch 79, and further turning of the handle causes the drive sprocket to rotate to pull the invoice paper through the system and out of the slot 76, where a copy of the invoice may be torn off by the purchaser. Any desired disposition may be made of the other copies.

Turning of the spool 54 moves link 111, and the spacer member 109 is retracted, while the ejector member 110 is pressed against the credit card. This forces the credit card into the slot 112, where it falls to door 113. If the door is unlocked, it may be opened and the card removed. If locked, an attendant must supply the key.

Spring 112a then returns the spacer member 109 and ejector member 110 to the position shown in Fig. 6. The counting system may then be reset by any desired means, and the vending machine is then ready for another sale.

The charge plate system of Fig. 6 may be directly substituted in the system of Fig. 5 by simply attaching leads 43 and 45 to the contacts 90, in place of the credit means utilizing pivoted arm 41. Pressing the charge plate into the slot so that the pins 89 enter the notch 88 causes a circuit to be completed across the contacts 90 so that the starter may be actuated. Thereafter the operation of the device is the same in all details.

The device of Fig. 2 is operated simply by slipping the charge plate into slot 99. The register drives the printing wheels, and after the desired quantity of product is withdrawn, lever 100 is pulled so as to print the total cost upon the invoice. This device does not have the locking means of Fig. 1 for requiring a signature on the credit card before actuation, but does provide a means for printing sale cost without manual entry by the service station attendant.

These systems lend themselves to a variety of business techniques, one of which is an automatic system in which a customer buys his gasoline and oil without any assistance whatever from an attendant, which includes the preparation of an invoice and procuring a signature on it. This system may be carried out with the device of Fig. 5, which requires the use of a charge plate and the provision of a signature, which are the two requirements ordinarily imposed by oil companies for credit purposes.

If desired the service station may be provided with blank credit cards fitted with the notches of Fig. 3 or the magnet of Fig. 4 so as to permit an attendant to operate the pump without operating the lock 50.

Another business technique useful with this invention is that of providing a central cashier, and simply closing bypass switches 47 and 70, so that a customer may serve himself from the machine without a credit card or applying a signature. The invoicing systems of Figs. 5 and 8 provide a printed ticket, which the customer tears off, and carries to the central cashier.

Different embodiments may be devised by persons skilled in the art which would still fall within the spirit of this invention. For example, other forms of credit cards than those shown in Figs. 3 and 4 might be used, and also different elements for such features as the registers, printers, and ejectors means may be used. Therefore this invention is not to be limited by the embodiment shown in the drawings and described in the description, but only in accordance with the scope of the appended claims.

I claim:

1. A vending machine for dispensing fluid products comprising: a pump for pumping said fluids; means for starting said pump; a meter for measuring the fluids pumped by said pump; a calculator driven by said meter for calculating the cost of the fluids dispensed as a function of a unit price; a printer connected to and driven by said calculator; printing means on said printer for printing the cost on an invoice; means for actuating said printer to print said cost; credit means so disposed and arranged as to prevent the operation of the pump unless credit identification is provided, comprising an electrical circuit connected to said means for starting the pump, said circuit including switching means actuatable by a magnetizeable member, said magnetizeable member being actuable by a magnet on a credit identification means, whereby insertion of said credit identification means with a magnet thereon which magnet is placed in a position of registration with said magnetizeable member when the credit card is fully inserted in said credit means, actuates said switching means, thereby completing and actuating the circuit and permitting the means for starting the pump to operate.

2. Apparatus according to claim 1 in which said credit means is provided with a slot for receiving said credit identification means, said slot being provided with pins insertable in notches in said credit identification means for restricting completion of said circuit to credit identification means bearing notches in positions corresponding to said pins.

3. A vending machine for dispensing fluid products comprising: a pump for pumping said fluids; a starter for said pump; a meter for measuring the fluids pumped by said pump; a calculator driven by said meter for calculating the cost of the fluids dispensed as a function of a unit price; a printer connected to and driven by said calculator means; an invoice; printing means on said printer for printing the cost on said invoice; means for actuating said printer to print said cost; credit means so disposed and arranged as to prevent starter operation unless credit identification means are provided thereto, said credit means comprising an override circuit in the means for driving said pump, a pivotable arm having magnetizeable means thereon, said arm completing the said override circuit in a first position, and opening said circuit in a second position, said first position being assumed when a credit card having a magnet thereon is placed in proximity thereto; means for requiring a signature on an invoice prior to recovery of said card comprising: ejector means for said card, actuator linkage for actuating said ejector means, a lock operatively connected to said actuator linkage, and control means for said lock comprising an electrical circuit, a pivoted arm in said circuit having magnetizeable means thereon, said arm completing said electrical circuit in a first magnetized condition, and opening said circuit in a second unmagnetized condition, whereby applying a magnetic stylus to said invoice causes the arm to close the electrical circuit and unlock the lock to permit said ejector means to eject the credit card.

References Cited in the file of this patent
UNITED STATES PATENTS

| | | |
|---|---|---|
| 2,612,428 | Vroom | Sept. 30, 1952 |
| 2,714,049 | Germann | July 26, 1955 |